US010926515B2

(12) United States Patent
Yamamoto et al.

(10) Patent No.: US 10,926,515 B2
(45) Date of Patent: Feb. 23, 2021

(54) INTERLAYER FILM FOR COLORED LAMINATED GLASS, AND COLORED LAMINATED GLASS

(71) Applicant: SEKISUI CHEMICAL CO., LTD., Osaka (JP)

(72) Inventors: Masaki Yamamoto, Shiga (JP); Manabu Matsumoto, Shiga (JP); Hiroaki Inui, Roermond (NL); Atsushi Nohara, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/316,394

(22) PCT Filed: Aug. 2, 2017

(86) PCT No.: PCT/JP2017/028132
§ 371 (c)(1),
(2) Date: Jan. 9, 2019

(87) PCT Pub. No.: WO2018/025932
PCT Pub. Date: Feb. 8, 2018

(65) Prior Publication Data
US 2019/0291389 A1    Sep. 26, 2019

(30) Foreign Application Priority Data

Aug. 3, 2016 (JP) .............................. JP2016-153260
Aug. 3, 2016 (JP) .............................. JP2016-153261

(51) Int. Cl.
*B32B 17/10* (2006.01)
*B60J 1/00* (2006.01)
(Continued)

(52) U.S. Cl.
CPC ...... *B32B 17/10651* (2013.01); *B29C 48/002* (2019.02); *B29C 48/022* (2019.02);
(Continued)

(58) Field of Classification Search
CPC . B32B 17/10–10798; B60J 1/00; B60J 1/001; B60J 1/002; B60J 1/003; B60J 1/02
See application file for complete search history.

(56) References Cited

U.S. PATENT DOCUMENTS 6,239,211 B1     5/2001  Keeping et al.
2007/0231584 A1* 10/2007 Hasegawa ......... B32B 17/10761
                                                    428/428

(Continued)

FOREIGN PATENT DOCUMENTS

EP    3034297    6/2016
EP    3248775    11/2017

(Continued)

OTHER PUBLICATIONS

International Search Report dated Oct. 31, 2017 in International (PCT) Application No. PCT/JP2017/028132 with English translation.

(Continued)

*Primary Examiner* — Z. Jim Yang
(74) *Attorney, Agent, or Firm* — Wenderoth, Lind & Ponack, L.L.P.

(57) ABSTRACT

The present invention aims to provide an interlayer film for a colored laminated glass which exhibits a visible light transmittance Tv of 5% or lower, small variation in visible light transmittance and an excellent appearance when incorporated in a laminated glass together with two clear glass plates in conformity with JIS R3202 (1996), and a colored laminated glass produced using the interlayer film for a colored laminated glass. Provided is an interlayer film for a (Continued)

colored laminated glass having, recesses on at least one surface, and exhibiting a visible light transmittance Tv of 5% or lower when incorporated in a laminated glass together with two clear glass plates in conformity with JIS R3202 (1996), the interlayer film for a colored laminated glass including a laminate of at least two layers including a first resin layer containing a thermoplastic resin and a colorant and a second resin layer containing a thermoplastic resin and no colorant, the elastic modulus $E_1$ of the first resin layer and the elastic modulus $B_2$ of the second resin layer having a ratio $E_1/E_2$ of 1.25 or more, the thickness $t_1$ of the first resin layer and the thickness $t_2$ of the second resin layer having a ratio $t_1/t_2$ of 2.0 or less.

4 Claims, 1 Drawing Sheet

(51) Int. Cl.

| | | |
|---|---|---|
| *B29C 48/00* | (2019.01) | |
| *B29C 48/21* | (2019.01) | |
| *B32B 37/10* | (2006.01) | |
| *B32B 37/18* | (2006.01) | |
| *B32B 7/023* | (2019.01) | |
| *C08K 3/04* | (2006.01) | |
| *C08K 5/103* | (2006.01) | |
| *C08L 29/14* | (2006.01) | |
| *B32B 27/20* | (2006.01) | |
| *B29K 105/00* | (2006.01) | |
| *B29L 7/00* | (2006.01) | |
| *B29L 9/00* | (2006.01) | |

(52) U.S. Cl.
CPC .............. *B29C 48/21* (2019.02); *B32B 7/023* (2019.01); *B32B 17/10* (2013.01); *B32B 17/10036* (2013.01); *B32B 17/10559* (2013.01); *B32B 17/10568* (2013.01); *B32B 17/10577* (2013.01); *B32B 17/10605* (2013.01); *B32B 17/10761* (2013.01); *B32B 27/20* (2013.01); *B32B 37/1018* (2013.01); *B32B 37/182* (2013.01); *B60J 1/001* (2013.01); *C08K 3/04* (2013.01); *C08K 5/103* (2013.01); *C08L 29/14* (2013.01); *B29K 2105/0032* (2013.01); *B29L 2007/008* (2013.01); *B29L 2009/00* (2013.01); *B32B 2250/04* (2013.01); *B32B 2250/40* (2013.01); *B32B 2307/402* (2013.01); *B32B 2307/4026* (2013.01); *B32B 2419/00* (2013.01); *B32B 2605/006* (2013.01)

(56) References Cited

U.S. PATENT DOCUMENTS

| | | | |
|---|---|---|---|
| 2009/0098354 A1* | 4/2009 | Torr | B32B 17/1011 428/215 |
| 2009/0311497 A1* | 12/2009 | Aoki | B32B 17/10366 428/214 |
| 2016/0151995 A1* | 6/2016 | Kitano | B32B 3/28 428/186 |
| 2016/0159050 A1 | 6/2016 | Lu et al. | |
| 2016/0159997 A1* | 6/2016 | Yui | C08K 5/103 428/141 |
| 2016/0288460 A1* | 10/2016 | Nakayama | B32B 17/10623 |
| 2017/0008257 A1* | 1/2017 | Nakayama | B32B 17/10587 |
| 2017/0015082 A1* | 1/2017 | Creytens | B32B 17/10568 |
| 2017/0144413 A1* | 5/2017 | Yamamoto | B32B 17/10678 |
| 2017/0274738 A1* | 9/2017 | Kanki | B32B 17/10761 |
| 2017/0361594 A1* | 12/2017 | Karagiannis | B32B 3/263 |
| 2018/0104934 A1 | 4/2018 | Mori et al. | |

FOREIGN PATENT DOCUMENTS

| | | |
|---|---|---|
| JP | 01-215621 | 8/1989 |
| JP | 07-062189 | 3/1995 |
| JP | 2007-055822 | 3/2007 |
| JP | 2010-248026 | 11/2010 |
| WO | 2016/163486 | 10/2016 |

OTHER PUBLICATIONS

Extended European Search Report for corresponding EP Application No. 17837034.2 dated Mar. 10, 2020.

* cited by examiner

INTERLAYER FILM FOR COLORED LAMINATED GLASS, AND COLORED LAMINATED GLASS

TECHNICAL FIELD

The present invention relates to an interlayer film for a colored laminated glass which exhibits, when incorporated in a laminated glass together with two clear glass plates in conformity with JIS R3202 (1996), a visible light transmittance Tv of 5% or lower, small variation in visible light transmittance and an excellent appearance, and a colored laminated glass produced using the interlayer film for a colored laminated glass.

BACKGROUND ART

Laminated glass is less likely to scatter even when shattered by external impact and can be safely used. Due to this advantage, laminated glass has been widely used, for example, in windshield, side glass, rear glass, and roof glass of vehicles including automobiles and windowpanes of aircraft, buildings, or the like. A known example of laminated glass is a type of laminated glass including at least a pair of glass plates integrated through, for example, an interlayer film for a laminated glass which contains a liquid plasticizer and a polyvinyl acetal resin.

Recently, glass has been desired to have various characteristics. From the standpoint of design characteristics, privacy protection, and light blocking properties, a colored laminated glass is now desired. In particular, highly colored laminated glass having a visible light transmittance Tv of 5% or lower is suitably used in roof glass of vehicles, windowpanes of buildings, or the like because it can exhibit particularly high privacy protection. Moreover, along with the spread of mirrorless cars equipped with onboard cameras, highly colored laminated glass is presumably used also in side glass of cars.

Colored laminated glass is commonly produced using an interlayer film for a laminated glass which contains a colorant such as a pigment (see Patent Literature 1, for example). However, an interlayer film for a laminated glass needs to contain a large amount of colorant to achieve the visible light transmittance Tv of 5% or lower in this method. An interlayer film for a laminated glass containing such a large amount of colorant has great variation in visible light transmittance from portion to portion, leading to an improper appearance.

CITATION LIST

Patent Literature

Patent Literature 1: JP 2010-248026 A

SUMMARY OF INVENTION

Technical Problem

The present invention aims to, in consideration of the state of the art, an interlayer film for a colored laminated glass which exhibits, when incorporated in a laminated glass together with two clear glass plates in conformity with JIS R3202 (1996), a visible light transmittance Tv of 5% or lower, small variation in visible light transmittance from portion to portion and an excellent appearance, and a colored laminated glass produced using the interlayer film for a colored laminated glass.

Solution to Problem

The present invention relates to an interlayer film for a colored laminated glass having recesses on at least one surface and exhibiting a visible light transmittance Tv of 5% or lower when incorporated in a laminated glass together with two clear glass plates in conformity with JIS R3202 (1996), the interlayer film for a colored laminated glass including a laminate of at least two layers including a first resin layer containing a thermoplastic resin and a colorant and a second resin layer containing a thermoplastic resin and no colorant, the elastic modulus $E_1$ of the first resin layer and the elastic modulus $E_2$ of the second resin layer having a ratio $E_1/E_2$ of 1.25 or more, the thickness $t_1$ of the first resin layer and the thickness $t_2$ of the second resin layer having a ratio $t_1/t_2$ of 2.0 or less.

The present invention is specifically described in the following.

The present inventors studied about the cause of the variation in visible light transmittance from portion to portion in an interlayer film for a colored laminated glass having recesses on at least one surface and exhibiting a visible light transmittance Tv of 5% or lower when incorporated in a laminated glass together with two clear glass plates in conformity with JIS R3202 (1996). As a result, they found out that the recesses formed on the surface of the interlayer film for a laminated glass cause such variation. In common production of a laminated glass, a laminate including at least two glass plates and an interlayer film for a laminated glass interposed between the two glass plates is passed through nip rolls for deaeration (squeeze deaeration) or put in a rubber bag and vacuum suctioned (vacuum deaeration) to be pressure-bonded while the air remaining between the glass plates and the interlayer film is removed. The resulting laminate is pressurized with heat, for example, in an autoclave to be pressure-bonded. Thus, a laminated glass is produced. In production of a laminated glass, deaeration properties are important upon stacking of a glass plate and an interlayer film for a laminated glass. The interlayer film for a laminated glass has fine protrusions and recesses on at least one surface for the purpose of ensuring deaeration properties in production of a laminated glass. In particular, with the structure in which recesses, among the protrusions and recesses, each have a groove shape with a continuous bottom (hereafter; also referred to as "shape of an engraved line") and the recesses in the shape of engraved lines adjacent to each other are regularly formed in parallel to each other, the interlayer film for a laminated glass can exhibit significantly excellent deaeration properties. The recesses formed on the surface of the interlayer film for a laminated glass are normally crushed upon pressure bonding in the production process of a laminated glass. Therefore, they have hardly caused troubles in the resulting laminated glass.

However, the present inventors found out that, in the case of an interlayer film for a laminated glass in which two or more resin layers including a layer containing a colorant are stacked, an influence of the recesses may be left in the layer containing a colorant in a laminated glass obtained through a laminated glass production process to cause variation in visible light transmittance from portion to portion.

Specifically, in the case where recesses are formed using an embossing roll or the like on a surface of an interlayer film for a laminated glass in which two or more resin layers including a layer containing a colorant are stacked, the recesses are presumably not only formed on the surface of the interlayer film but also transferred to the interface between the resin layers due to the pressure during the processing, leading to an uneven interface. In particular, in the case where the recesses in the shape of engraved lines are formed on a surface, the recesses in the shape of engraved lines are presumably strongly transferred to the interface between the layers. The recesses on a surface of the interlayer film are crushed upon pressure bonding in the laminated glass production process but protrusions and recesses transferred to the interface between resin layers are left. Such protrusions and recesses remaining at the interface between the resin layers are hardly recognizable with naked eye in a transparent part but can be recognized as variation of visible light rays.

To overcome the situation, the present inventors made an interlayer film for a colored laminated glass including a laminate of at least two layers including a first resin layer containing a thermoplastic resin and a colorant and a second resin layer containing a thermoplastic resin and no colorant. In addition, they increased the elastic modulus of the first resin layer to suppress transferring of the recesses to the interface, thereby preventing the variation in visible light transmittance. Thus, the present invention was completed.

The interlayer film for a colored laminated glass of the present invention includes a laminate of at least two layers including a first resin layer containing a thermoplastic resin and a colorant and a second resin layer containing a thermoplastic resin and no colorant. The first resin layer adjusts the visible light transmittance of the interlayer film for a colored laminated glass of the present invention.

The interlayer film for a colored laminated glass of the present invention is preferably a laminate of at least three layers including the first resin layer interposed between two second resin layers. The interlayer film for a colored laminated glass that is a laminate of at least three layers can prevent variation in visible light transmittance even in the case where the recesses are formed on both surfaces.

The interlayer film for a colored laminated glass of the present invention has recesses on at least one surface. In the interlayer film for a colored laminated glass of the present invention, preferably, the recesses each have a groove shape with a continuous bottom (shape of an engraved line) and they are regularly arranged side by side.

In the interlayer film for a colored laminated glass of the present invention, preferably, the recesses each have a groove shape with a continuous bottom and they are arranged side by side in parallel to each other. Moreover, in the interlayer film for a colored laminated glass of the present invention, preferably, the recesses each have a groove shape with a continuous bottom and they are regularly arranged side by side in parallel to each other.

Commonly, easiness of deaeration upon preliminary pressure bonding and final pressure bonding of a laminate including two glass plates and an interlayer film for a laminated glass interposed between the two glass plates closely relates to the communication properties and smoothness of the bottoms of the recesses.

When the recesses on at least one surface of the interlayer film for a laminated glass each having a groove shape with a continuous bottom are regularly arranged side by side, the communication properties of the bottoms are enhanced to markedly increase the deaeration properties upon preliminary pressure bonding and final pressure bonding.

When the recesses on at least one surface of the interlayer film for a laminated glass each have a groove shape with a continuous bottom and they are arranged side by side in parallel to each other, the communication properties of the bottoms are enhanced to markedly increase the deaeration properties upon preliminary pressure bonding and final pressure bonding.

Moreover, when the recesses on at least one surface of the interlayer film for a laminated glass each have a groove shape with a continuous bottom and they are regularly arranged side by side in parallel to each other, the communication properties of the bottoms are further enhanced to further increase the deaeration properties upon preliminary pressure bonding and final pressure bonding.

The state of "regularly arranged side by side" means that the recesses each having a groove shape with a continuous bottom are arranged side by side in a certain direction at intervals in the observation of the surface with the recesses of the interlayer film. The state of "arranged side by side in parallel to each other" means both a state where the recesses adjacent to each other are arranged side by side in parallel to each other at equal intervals and a state where the recesses adjacent to each other are arranged side by side in parallel to each other but the intervals therebetween are not necessarily equal to each other.

Figure 1:
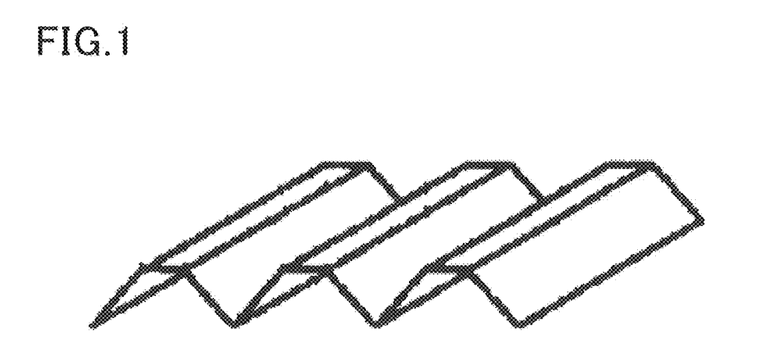
FIG. 1 is a schematic view illustrating an exemplary interlayer film for a laminated glass in which recesses each having a groove shape with a continuous bottom are arranged on a surface at equal intervals and adjacent recesses are arranged side by side in parallel to each other.
Figure 2:
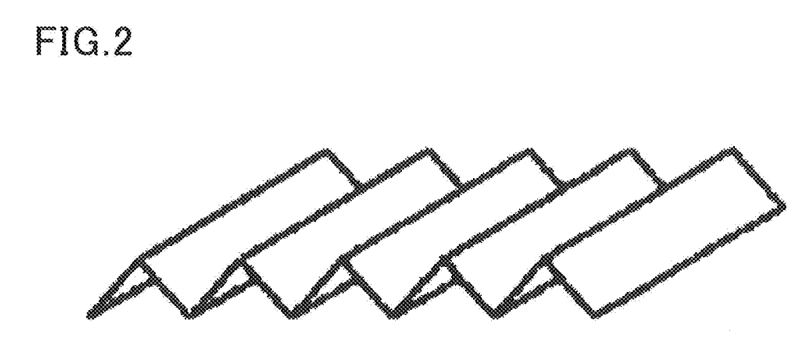
FIG. 2 is a schematic view illustrating an exemplary interlayer film for a laminated glass in which recesses each having a groove shape with a continuous bottom are arranged on a surface at equal intervals and adjacent recesses are arranged side by side in parallel to each other.
Figure 3:
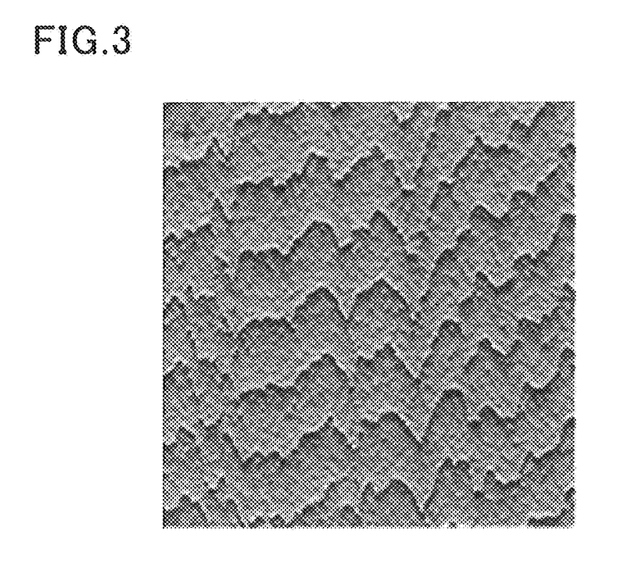
FIG. 3 is a 3D roughness image data obtained by the measurement using a 3D profilometer performed on a surface of an interlayer film for a laminated glass having recesses each having a groove shape with a continuous bottom on the surface.

FIGS. 1 and 2 each schematically illustrate an exemplary interlayer film for a laminated glass in which recesses each having a groove shape with a continuous bottom are arranged at equal intervals and the recesses adjacent to each other are arranged side by side in parallel to each other on the surface. FIG. 3 shows image data of 3D roughness of the surface of the interlayer film for a laminated glass in which recesses each having a groove shape with a continuous bottom are regularly arranged side by side, obtained using a 3D profilometer ("KS-1100" with a tip head of "LT-9510VM" available from Keyence Corporation).

The lower limit of the roughness (Rz) of the surface with the recesses is preferably 5 μm and the upper limit thereof is preferably 90 μm. When the roughness (Rz) of the surface with the recesses is within this range, excellent deaeration properties can be exhibited.

The roughness (Rz) of the surface with the recesses herein is measured by a method in conformity with JIS B-0601 (1994).

The roughness (Rz) of the surface with the recesses herein means the ten-point average roughness (Rz), which is defined in "Surface roughness—Definition and designation" JIS B-0601 (1994), of the resulting interlayer film obtained by a method in conformity with JIS B-0601 (1994). The roughness (Rz) of the recesses can be measured, for example, using "Surfcorder SE300" available from Kosaka Laboratory Ltd. under the probe meter conditions of a cut-off value of 2.5 mm, a reference length of 2.5 mm, an evaluation length of 12.5 mm, a tip radius of a probe of 2 μm, a tip angle of 60°, and a measurement speed of 0.5 mm/s. The measurement is performed in an environment of 23° C. and 30 RH %. In the case where the recesses are in the shape of engraved lines, the probe is moved in a direction perpendicular to the groove direction. In the case where the recesses are not in the shape of engraved lines, the probe may be moved in any direction.

The lower limit of the roughness (Rz) of the recesses in the shape of engraved lines is preferably 10 μm and the upper limit thereof is preferably 90 μm. When the roughness (Rz) of the recesses in the shape of engraved lines is within this range, excellent deaeration properties can be exhibited. The lower limit of the roughness (Rz) of the recesses in the shape of engraved lines is more preferably 20 µm and the upper limit thereof is more preferably 80 µm.

The roughness (Rz) of the recesses in the shape of engraved lines herein is measured by a method in conformity with JIS B-0601 (1994).

The lower limit of the interval between the adjacent recesses in the shape of engraved lines is preferably 10 µm and the upper limit thereof is preferably 500 µm. When the interval between the recesses in the shape of engraved lines is within this range, excellent deaeration properties can be exhibited. The lower limit of the interval between the recesses in the shape of engraved lines is more preferably 50 µm and the upper limit thereof is more preferably 300 µm.

The interval between the recesses in the shape of engraved lines herein can be obtained by observing first and second surfaces (observation range: 20 mm×20 mm) of the interlayer film for a laminated glass with an optical microscope (e.g., "BS-8000III" available from Sonic Corp.) to measure the intervals between adjacent recesses and calculating the average of the shortest distances between deepest bottoms of the adjacent recesses.

In the case where the recesses are not in the shape of engraved lines, the interval Sm between the recesses on the surface with the recesses is preferably 600 µm or less, more preferably 450 µm or less, still more preferably 400 µm or less, particularly preferably 350 µm or less. With such an interval, the autohesion force between the interlayer films for a laminated glass when wound into a roll can be lowered, facilitating unwinding of the interlayer film.

The interval between the recesses in the case where the recesses are not in the shape of engraved lines herein means, for example, the average interval (Sm) between the recesses of the resulting interlayer film obtained by a method in conformity with JIS B-0601 (1994), defined in "Surface roughness—Definition and designation" JIS B-0601 (1994). The interval Sm between the recesses can be measured, for example, using "Surfcorder SE300" available from Kosaka Laboratory Ltd. under the probe meter conditions of a cut-off value of 2.5 mm, a reference length of 2.5 mm, an evaluation length of 12.5 mm, a tip radius of a probe of 2 µm, a tip angle of 60°, and a measurement speed of 0.5 mm/s. The measurement is performed in an environment of 23° C. and 30 RH %. The probe may be moved in any direction.

The first resin layer may be provided on the entire surface or a part of the interlayer film for a colored laminated glass of the present invention. For example, a shade in the windshield of an automobile can be prepared by providing the first resin layer on a part of the interlayer film for a laminated glass.

The interlayer film for a colored laminated glass of the present invention processed into the laminate can also provide an effect of suppressing transfer of colorants from the resulting interlayer film for a colored laminated glass.

The interlayer film for a laminated glass is commonly stored in the state of being wound into a roll, and unwound from the roll to be provided in production of a laminated glass. In the case of an interlayer film for a laminated glass containing a large amount of colorant to set the visible light transmittance Tv to 5% or lower, the colorant is likely to partly bleed out to the surface of the interlayer film for a laminated glass. In such a case, the bleeding colorant may be transferred to another interlayer film for a laminated glass or a hand of an operator during the storage of the interlayer film for a colored laminated glass in the form of a roll or during the processing of the interlayer film for a laminated glass unwound from the roll. Lamination of the second resin layer not containing a colorant can prevent transfer of colorants from the first resin layer containing a colorant.

The first resin layer contains a thermoplastic resin and a colorant.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyesters, polyethers, polyamides, polycarbonates, polyacrylates, polymethacrylates, polyvinyl chloride, polyethylene, polypropylene, polystyrene, polyvinyl acetals, and ethylene-vinyl acetate copolymers. In particular, the resin layer contains preferably a polyvinyl acetal or an ethylene-vinyl acetate copolymer, more preferably a polyvinyl acetal.

The polyvinyl acetal can be prepared by acetalizing polyvinyl alcohol with an aldehyde. The polyvinyl alcohol can be prepared by saponifying polyvinyl acetate, for example. The degree of saponification of the polyvinyl alcohol is commonly within a range of 70 to 99.8 mol %.

The average degree of polymerization of the polyvinyl alcohol is preferably 200 or higher, more preferably 500 or higher, still more preferably 1,700 or higher, particularly preferably higher than 1,700, and preferably 5,000 or lower, more preferably 4,000 or lower, still more preferably 3,000 or lower, particularly preferably lower than 3,000. When the average degree of polymerization is equal to or higher than the lower limit, the penetration resistance of the laminated glass is further enhanced. When the average degree of polymerization is equal to or lower than the upper limit, the formation of the interlayer film is facilitated.

The average degree of polymerization of the polyvinyl alcohol is obtained by the method in conformity with "Testing methods for polyvinyl alcohol", JIS K6726.

The carbon number of the acetal group in the polyvinyl acetal is not particularly limited. The aldehyde used for preparation of the polyvinyl acetal is not particularly limited. The lower limit of the carbon number of the acetal group in the polyvinyl acetal is preferably 3, and the upper limit thereof is preferably 6. When the carbon number of the acetal group in the polyvinyl acetal is 3 or more, the glass transition temperature of the interlayer film is sufficiently lowered and bleeding of the plasticizer can be prevented. When the carbon number of the aldehyde is 6 or less, synthesis of the polyvinyl acetal is facilitated, ensuring the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, preferred is propionaldehyde, n-butyraldehyde, isobutyraldehyde, n-hexylaldehyde, or n-valeraldehyde, more preferred is propionaldehyde, n-butyraldehyde, or isobutyraldehyde, and still more preferred is n-butyraldehyde. One aldehyde may be used alone, or two or more aldehydes may be used in combination.

The content rate of hydroxy groups (hydroxy group content) of the polyvinyl acetal is preferably 10 mol % or higher, more preferably 15 mol % or higher, still more preferably 18 mol % or higher, and preferably 40 mol % or lower, more preferably 35 mol % or lower. When the content rate of hydroxy groups is equal to or higher than the lower limit, the adhesion force of the interlayer film is further enhanced. When the content rate of hydroxy groups is equal to or lower than the upper limit, the flexibility of the interlayer film is improved to facilitate handling of the interlayer film.

The content rate of hydroxy groups of the polyvinyl acetal is a value in percentage of the mole fraction obtained by dividing the amount of ethylene groups to which hydroxy groups are bonded by the amount of all the ethylene groups in the main chain. The amount of ethylene groups to which hydroxy groups are bonded can be determined by the measurement in conformity with "Testing methods for polyvinyl alcohol", JIS K6726 or in conformity with ASTM D1396-92.

The degree of acetylation (acetyl group content) of the polyvinyl acetal is preferably 0.1 mol % or higher, more preferably 0.3 mol % or higher, still more preferably 0.5 mol % or higher, and preferably 30 mol % or lower, more preferably 25 mol % or lower, still more preferably 20 mol % or lower. When the degree of acetylation is equal to or higher than the lower limit, the compatibility between the polyvinyl acetal and the plasticizer is enhanced. When the degree of acetylation is equal to or lower than the upper limit, the moisture resistance of the interlayer film and the laminated glass is improved.

The degree of acetylation is a value in percentage of the mole fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain. The amount of ethylene groups to which acetal groups are bonded can be measured in conformity with "Testing methods for polyvinyl butyral", JIS K6728 or in conformity with ASTM D1396-92.

The degree of acetalization of the polyvinyl acetal (degree of butyralization in the case of polyvinyl butyral resin) is preferably 50 mol % or higher, more preferably 53 mol % or higher, still more preferably 60 mol % or higher, particularly preferably 63 mol % or higher, and preferably 85 mol % or lower, more preferably 75 mol % or lower, still more preferably 70 mol % or lower. When the degree of acetalization is equal to or higher than the lower limit, the compatibility between the polyvinyl acetal and the plasticizer is enhanced. When the degree of acetalization is equal to or lower than the upper limit, the reaction time needed for producing the polyvinyl acetal is reduced.

The degree of acetalization is a value in percentage of the mole fraction obtained by dividing the amount of ethylene groups to which acetal groups are bonded by the amount of all the ethylene groups in the main chain.

The degree of acetalization is obtainable by measuring the degree of acetylation and the content rate of hydroxy groups by a method in conformity with "Testing methods for polyvinyl butyral", JIS K6728 or in conformity with ASTM D1396-92, calculating the mole fractions based on the measurement results, and subtracting the mole fractions corresponding to the degree of acetylation and the content rate of hydroxy groups from 100 mol %.

The content rate of hydroxy groups (hydroxy group content), degree of acetalization (degree of butyralization), and degree of acetylation are preferably calculated based on the measurement results by methods in conformity with "Testing methods for polyvinyl butyral", JIS K6728. In the case where the polyvinyl acetal is a polyvinyl butyral resin, the content rate of hydroxy groups (hydroxy group content), degree of acetalization (degree of butyralization), and degree of acetylation are preferably calculated based on the measurement results by methods in conformity with "Testing methods for polyvinyl butyral", JIS K6728.

The colorant is not particularly limited, and any pigment or dye conventionally used for interlayer films for a laminated glass may be used. In particular, a pigment is favorably used because it can easily set the visible light transmittance Tv of the interlayer film for a colored laminated glass to 5% or lower.

The pigment is not particularly limited, and examples thereof include phthalocyanine, derivatives of phthalocyanine, anthraquinone, derivatives of anthraquinone, perylene, derivatives of perylene, titanium oxide, derivatives of titanium oxide, azo compounds, and carbon black. In particular, preferred are phthalocyanine, derivatives of phthalocyanine, anthraquinone, derivatives of anthraquinone, perylene, derivatives of perylene, and carbon black, and particularly preferred is carbon black because they are highly compatible with the thermoplastic resin and are less likely to bleed out.

The amount of the colorant in the first resin layer is not particularly limited as long as the visible light transmittance Tv can be set to 5% or lower when incorporated in a laminated glass together with two clear glass plates in conformity with JIS R3202 (1996). For example, in the case where the colorant is carbon black, the lower limit of the amount of carbon black relative to 100% by mass of the first resin layer is preferably 0.01% by mass and the upper limit thereof is preferably 0.30% by mass. When the amount of the carbon black is within this range, the visible light transmittance Tv of the colored laminated glass can be adjusted to 5% or lower while preventing bleeding thereof. The lower limit of the amount of the colorant is more preferably 0.02% by mass and the upper limit thereof is more preferably 0.20% by mass. The lower limit is still more preferably 0.03% by mass and the upper limit is still more preferably 0.10% by mass. The upper limit is particularly preferably 0.08% by mass, most preferably 0.05% by mass.

The first resin layer preferably contains a plasticizer.

The plasticizer is not particularly limited as long as it is a plasticizer commonly used for interlayer films for a laminated glass, and examples thereof include organic plasticizers such as monobasic organic acid esters and polybasic organic acid esters and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The amount of the plasticizer in the first resin layer is not particularly limited. The lower limit of the amount of the plasticizer relative to 100 parts by mass of the thermoplastic resin is preferably 25 parts by mass and the upper limit thereof is preferably 80 parts by mass. When the amount of the plasticizer is within this range, high penetration resistance can be exhibited. The lower limit of the amount of the plasticizer is more preferably 30 parts by mass and the upper limit thereof is more preferably 70 parts by mass.

In the case where the first resin layer serves as an outermost layer to be directly in contact with glass, the first resin layer preferably contains an adhesion modifier.

As the adhesion modifier, an alkali metal salt or an alkaline earth metal salt is preferably used, for example. Examples of the adhesion modifier include salts of potassium, sodium, magnesium, and the like. In particular, preferred is a magnesium salt because the adhesion force between glass and the interlayer film can be easily adjusted in production of a laminated glass.

Examples of the acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

The first resin layer may optionally contain additives such as an antioxidant, a light stabilizer, a modified silicone oil as an adhesion modifier, a flame retardant, an antistatic agent, a damp proofing agent, a heat ray reflecting agent, a fluorescent agent, or a heat absorber.

The second resin layer contains a thermoplastic resin. Examples of the thermoplastic resin contained in the second resin layer include those exemplified as the thermoplastic resin contained in the first resin layer.

The second resin layer may contain the plasticizer, an adhesion modifier, and optionally additives such as an antioxidant, a light stabilizer, a modified silicone oil as an adhesion modifier, a flame retardant, an antistatic agent, a damp proofing agent, a heat reflector, a fluorescent agent, or a heat absorber.

The second resin layer does not contain a colorant. The second resin layer may contain a colorant in a small amount that does not cause bleeding or transfer. Also in the case where the colorant contained in the first resin layer is partly transferred to the second resin layer originally not containing a colorant, the second resin layer may contain a colorant as long as the amount of the colorant is small enough to avoid bleeding or transfer. Specifically, for example, the colorant in an amount of 0.001 parts by mass or less relative to 100 parts by mass of the thermoplastic resin does not cause bleeding or transfer, not impairing the excellent effects of the present invention.

In the case where the second resin layer contains a colorant, the same colorant as that contained in the first resin layer may be used.

In the interlayer film for a colored laminated glass of the present invention, the elastic modulus $E_1$ of the first resin layer and the elastic modulus $E_2$ of the second resin layer have a ratio $E_1/E_2$ of 1.25 or more. Lamination of such a second resin layer having a high elastic modulus can prevent transfer of recesses to the interface upon embossing and prevent variation in visible light transmittance. The ratio $E_1/E_2$ is preferably 1.30 or more, more preferably 1.35 or more.

The elastic modulus of each resin layer can be measured by the following method.

A composition for forming a first resin layer is sufficiently kneaded (mixed) with a mixing roll, and then press-molded at 150° C. to provide a molded article (first resin layer) having a thickness of 800 μm. From the obtained molded article is stamped out a test piece using a super dumbbell cutter "SDK-600" available from Dumbbell Co., Ltd. The obtained test piece is stored at 23° C. and a humidity of 30% RH for 12 hours. Then, the test piece is subjected to a tensile test in a thermostatic chamber at 23° C. using TENSILON available from A&D Company, Limited at a rate of 200 ram/min. The gradient of the obtained stress-strain curve within a range of the strain of 0 to 10% is calculated, and the obtained value is taken as a Young's modulus. The obtained Young's modulus is taken as the elastic modulus of the first resin layer. The elastic moduli of the second resin layer and other layers can be also measured by the same method.

The test piece may also be obtained by peeling the first resin layer and the second resin layer from the interlayer film in an environment of 23° C., press-molding the obtained first resin layer at 150° C. (10 minutes at 150° C. without pressurization, and 10 minutes at 150° C. under pressurization) to a thickness of 800 μm, and stamping a test piece out the resulting first layer using a super dumbbell cutter "SDK-600" available from Dumbbell Co., Ltd.

The ratio $E_1/E_2$ may be set to 1.25 or more by any method, and examples of the method include selecting the thermoplastic resin used in each resin layer. For example, a thermoplastic resin having a higher degree of crosslinking or a larger weight average molecular weight provides a resin layer with a higher elastic modulus. The elastic modulus of the resin layer may also be adjusted by the amount of the added plasticizer. When the amount of the added plasticizer is larger, the elastic modulus of the resin layer is lower. The elastic modulus of the resin layer may also be adjusted by the amount of the added colorant. When the amount of the added colorant is larger, the elastic modulus of the resin layer is higher. Specifically, when the amount of the colorant in the first resin layer is set to 0.07% by mass or more, the value of $E_1$ relative to $E_2$ can be easily increased. When the amount of the colorant in the first resin layer is set to 0.09% by mass or more, the value of $E_1$ relative to $E_2$ can be more easily increased. When the amount of the colorant in the first resin layer is set to 0.12% by mass or more, the value of $E_1$ relative to $E_2$ can be still more easily increased.

In the interlayer film for a colored laminated glass of the present invention, the thickness $t_1$ of the first resin layer and the thickness $t_2$ of the second resin layer have a ratio $t_1/t_2$ of 2.0 or less. A relatively thick second resin layer can prevent transfer of recesses to the interface upon embossing and prevent variation in visible light transmittance. The ratio $t_1/t_2$ is preferably 1.5 or less, more preferably 1.2 or less.

Specifically, the average thickness of the first resin layer is preferably 100 to 500 μm and the average thickness of the second resin layer is preferably 100 μm or more.

When the average thickness of the first resin layer is within the range of 100 to 500 μm, the visible light transmittance Tv can be easily adjusted to 5% or lower by adding the colorant in production of a laminated glass using two clear glass plates in conformity with JIS R3202 (1996). The lower limit of the average thickness of the first resin layer is more preferably 150 μm and the upper limit thereof is more preferably 450 μm. The lower limit is still more preferably 200 μm, particularly preferably 300 μm and the upper limit is still more preferably 400 μm.

When the average thickness of the second resin layer is 100 μm or more, variation in the average thickness of the first resin layer can be suppressed. The average thickness of the second resin layer is more preferably 200 μm or more, still more preferably 250 μm or more. The upper limit of the average thickness of the second resin layer is not particularly limited, and is practically about 1,000 μm.

The thickness of each resin layer of the interlayer film for a colored laminated glass can be obtained by cutting the interlayer film in a direction perpendicular to the thickness direction with a sharp razor blade so that the cross section of each resin layer is exposed, observing the exposed cross section of the interlayer film with a digital microscope, and measuring the thickness of each resin layer of the interlayer film using a scale bar (micro gauge) and simple measurement function. The digital microscope used may be, for example, "DSX500" available from Olympus Corporation.

In the simple measurement function, the parallel width distance or the distance between two points is preferably selected. The observation is preferably performed under magnification of 277 times. The visual field is preferably 980 μm×980 μm. Arbitrarily selected 20 sites of the interlayer film for a laminated glass are observed using the digital microscope, and the thickness of each resin layer is measured at 5 sites in the same visual field. The thickness is measured at 100 sites (20×5 sites) in total, and the average of the measurement results was obtained, thereby obtaining the average thicknesses of the first resin layer and the second resin layer.

The interlayer film for a colored laminated glass of the present invention has a visible light transmittance Tv of 5% or lower. The interlayer film with such a visible light transmittance can exhibit excellent design characteristics, privacy protection, light blocking effect, or the like, and can be suitably used for side glass, rear glass, or roof glass of vehicles or windowpanes of buildings or the like. The interlayer film for a colored laminated glass of the present invention preferably has a visible light transmittance Tv of 2% or lower.

The visible light transmittance is measured by the following procedure. A laminated glass is produced using two clear glass plates in conformity with JIS R3202 (1996). The visible light transmittance within a wavelength range of 380 to 780 nm of the obtained laminated glass is measured at arbitrarily selected 20 sites using a spectrophotometer ("U-4100" available from Hitachi High-Technologies Corporation) in conformity with JIS R 3106 (1998). The average and the standard deviation of the visible light transmittances measured at 20 sites are obtained, and the value obtained by dividing the standard deviation by the average of the visible light transmittance, and centupling the obtained quotient (standard deviation/average of visible light transmittance × 100) is taken as the CV value.

Preferably, the two clear glass plates in conformity with JIS R3202 (1996) each have a thickness of 2.4 to 2.5 mm and a visible light transmittance of 90.0 to 91.0% because measurement variation can be suppressed in the measurement of the visible light transmittance after production of a laminated glass. In particular, each clear glass plate more preferably has a thickness of 2.5 mm and a visible light transmittance of 90.5%.

The interlayer film for a colored laminated glass of the present invention has recesses on at least one surface. Such an interlayer film can ensure deaeration properties during production of a laminated glass. Preferably, the recesses each have a groove shape with a continuous bottom (shape of an engraved line) and the adjacent recesses in the shape of engraved lines are regularly formed in parallel to each other.

In the interlayer film for a colored laminated glass of the present invention, the ratio $E_1/E_2$ is 1.25 or more and the ratio $t_1/t_2$ is 2.0 or less, which prevents variation in visible light transmittance even in the case where the interlayer film has recesses in the shape of engraved lines.

The interlayer film for a colored laminated glass of the present invention may be produced by any method, and an exemplary method includes extruding the first resin layer and the second resin layer by a co-extrusion method.

In the case of producing the interlayer film for a colored laminated glass of the present invention by a co-extrusion method, a feed block method is preferably employed. For details of the feed block method, see JP 5220607 B. A device for producing an interlayer film for a laminated glass in the feed block method has a first extruder for forming an outermost surface layer. To the first extruder is connected a first feed hole provided in a guide for arranging a layer, and to the first feed hole is connected one end of a channel for forming an outermost surface layer in the guide for arranging a layer. The channel for forming an outermost surface layer is branched at the middle into first and second branch channels. The end portions of the first and second branch channels are respectively connected to the first and second outlets for forming the outermost surface layer.

Employment of the feed block method allows setting of the thickness or width of the first resin layer as desired in production of an interlayer film for a colored laminated glass in which the first resin layer is only partly provided, and enables production of an interlayer film for a colored laminated glass with no color streaks or color omission.

The present invention also encompasses a colored laminated glass including a pair of glass plates and the interlayer film for a colored laminated glass of the present invention interposed between the pair of glass plates.

The glass plates may be commonly used transparent plate glass. Examples thereof include inorganic glass such as float plate glass, polished plate glass, molded plate glass, meshed glass, wire-reinforced plate glass, colored plate glass, heat-absorbing glass, heat-reflecting glass, and green glass. Also usable is UV light-shielding glass in which a UV light-shielding coat layer is formed on the surface of glass. Moreover, organic plastic plates such as polyethylene terephthalate, polycarbonate, or polyacrylate plates may also be used.

As the glass plates, two or more kinds of glass plates may be used. Exemplary cases thereof include a colored laminated glass in which the interlayer film for a colored laminated glass of the present invention is sandwiched between a transparent float plate glass and a colored glass plate such as green glass. Moreover, as the glass plates, two or more kinds of glass plates different in thickness may be used.

Advantageous Effects of Invention

The present invention can provide an interlayer film for a colored laminated glass which exhibits, when incorporated in a laminated glass together with two clear glass plates in conformity with JIS R3202 (1996), a visible light transmittance Tv of 5% or lower, small variation in visible light transmittance from portion to portion and an excellent appearance, and a colored laminated glass produced using the interlayer film for a colored laminated glass.

DESCRIPTION OF EMBODIMENTS

Embodiments of the present invention are specifically described in the following with reference to, but not limited to, examples.

Example 1

(1) Preparation of a Resin Composition for First Resin Layers

Polyvinyl alcohol having an average degree of polymerization of 1,700 was acetalized using n-butyraldehyde to provide polyvinyl butyral having an acetyl group content of 1 mol %, a butyral group content of 69 mol %, and a hydroxy group content of 30 mol % (hereafter, also referred to as "PVB"). To 100 parts by mass of the obtained PVB were added 40 parts by mass of triethylene glycol-di-2-ethylhexanoate (3GO) as a plasticizer and carbon black as a colorant, and they were sufficiently kneaded using a mixing roll to prepare a resin composition for first resin layers. The amount of the added colorant was set to 0.095% by mass in 100% by mass of the first resin layer and 0.038% by mass in 100% by mass of the entire interlayer film for a colored laminated glass to be obtained.

(2) Preparation of a Resin Composition for Second Resin Layers

To 100 parts by mass of the PVB was added 40 parts by mass of triethylene glycol-di-2-ethylhexanoate (3GO) as a plasticizer, and they were sufficiently kneaded using a mixing roll to prepare a resin composition for second resin layers.

(3) Production of an Interlayer Film for a Colored Laminated Glass

The obtained resin composition for first resin layers and resin composition for second resin layers were extruded from a co-extruder under the condition of an extrusion temperature of 200° C., thereby preparing a laminate having a two-layer structure (first resin layer/second resin layer).

(4) Formation of Recesses

A pair of embossing rolls having a large number of fine recesses and a large number of fine protrusions formed thereon was used as a device for transferring fine protrusions and recesses. The obtained laminate was passed through the embossing rolls. Thus, a laminate having a large number of fine recesses and a large number of fine protrusions formed thereon was prepared.

Another pair of embossing rolls was further used as a device for transferring protrusions and recesses. The obtained laminate having a large number of fine recesses and a large number of fine protrusions formed thereon was passed through the embossing rolls, and to the both surfaces of the laminate were formed recesses having a surface roughness (Rz) of 31 μm in which recesses each having a groove shape with a continuous bottom (shape of an engraved line) were formed in parallel to each other at equal intervals. Thus, an interlayer film for a colored laminated glass was obtained. The pairs of embossing rolls each include a metal roll having a surface milled with a triangular oblique line-type mill and a rubber roll having a JIS hardness of 45 to 75.

The surface roughness Rz was measured by a method in conformity with JIS B-0601 (1994). The transferring conditions for formation of the recesses each having a groove shape (shape of an engraved line) were a temperature of a laminate of 95° C., a roll temperature of 130° C., and a press pressure of 500 kPa.

The elastic modulus and thickness of each resin layer in the obtained interlayer film for a colored laminated glass were measured by the methods described above.

The first resin layer had an elastic modulus $E_1$ of 9.6 $N/mm^2$ and a thickness $t_1$ of 305 μm. The second resin layer had an elastic modulus $E_2$ of 7.0 $N/mm^2$ and a thickness $t_2$ of 455 μm.

(5) Production of a Colored Laminated Glass

The obtained interlayer film for a colored laminated glass was sandwiched between a pair of clear glass plates (5 cm in length×5 cm in width, 1.0 mm in thickness) to prepare a laminate. The obtained laminate was press-bonded under vacuum at 90° C. for 30 minutes using a vacuum laminator. The press-bonded laminate was further press-bonded for 20 minutes under 14 MPa at 140° C. using an autoclave. Thus, a colored laminated glass was obtained.

Examples 2 and 3

An interlayer film for a colored laminated glass having a three-layer structure (second resin layer/first resin layer/second resin layer) was produced in which the amount of the colorant and the thickness of each resin layer were adjusted to the values as shown in Table 1, and a colored laminated glass was obtained. The interlayer film for a colored laminated glass and laminated glass were produced as in Example 1.

Comparative Example 1

In the preparation of a resin composition for first resin layers, the amount of the added colorant was changed to 0.052% by mass in 100% by mass of the resulting first resin layer and 0.037% by mass in 100% by mass of the entire interlayer film for a colored laminated glass to be obtained. Using this resin composition for first resin layers, an interlayer film for a colored laminated glass having a three-layer structure in which the thickness of each resin layer was adjusted to the value as shown in Table 1 was produced and then a colored laminated glass was obtained as in Example 2.

Comparative Example 2

In the preparation of a resin composition for first resin layers, the amount of the added colorant was changed to 0.043% by mass in 100% by mass of the resulting first resin layer and 0.037% by mass in 100% by mass of the entire interlayer film for a colored laminated glass to be obtained. Using this resin composition for first resin layers, an interlayer film for a colored laminated glass having a three-layer structure in which the thickness of each resin layer was adjusted to the value as shown in Table 1 was produced as in Example 2.

Examples 4 to 8, Comparative Examples 3 to 6

An interlayer film for a colored laminated glass and a colored laminated glass were obtained as in Example 1, except that the amount of the plasticizer, the concentration of the colorant, and the thickness of each resin layer were changed as shown in Table 2.

(Evaluation)

The interlayer films for a laminated glass obtained in the examples and comparative examples were evaluated by the following method. Tables 1 and 2 show the results.

(Measurement of Visible Light Transmittance)

The visible light transmittance within a wavelength range of 380 to 780 nm was measured at an arbitrarily selected 20 sites on the obtained laminated glass using a spectrophotometer ("U-4100" available from Hitachi High-Technologies Corporation) in conformity with JIS R 3106 (1998).

The average and the standard deviation of the visible light transmittances measured at 20 sites were obtained. The obtained standard deviation was divided by the average of the visible light transmittances, and the quotient was centupled. The obtained value (standard deviation/average of visible light transmittance×100) was defined as a CV value.

The visible light transmittance of the clear glass plates used in the examples and comparative examples was 90.5%.

TABLE 1

| | | | | Example 1 | Example 2 | Example 3 | Comparative Example 1 | Comparative Example 2 |
|---|---|---|---|---|---|---|---|---|
| Resin composition | First resin layer | Resin | Kind | PVB | PVB | PVB | PVB | PVB |
| | | | Parts by mass | 100 | 100 | 100 | 100 | 100 |
| | | Plasticizer | Kind | 3GO | 3GO | 3GO | 3GO | 3GO |
| | | | Parts by mass | 40 | 40 | 40 | 40 | 40 |
| | | Colorant | Kind | Carbon black | Carbon black | Carbon black | Carbon black | Carbon black |
| | | | % by mass | 0.095 | 0.095 | 0.072 | 0.052 | 0.043 |
| | Second resin layer | Resin | Kind | PVB | PVB | PVB | PVB | PVB |
| | | | Parts by mass | 100 | 100 | 100 | 100 | 100 |
| | | Plasticizer | Kind | 3GO | 3GO | 3GO | 3GO | 3GO |
| | | | Parts by mass | 40 | 40 | 40 | 40 | 40 |
| Interlayer film for laminated glass | Second resin layer | Young's modulus $E_2$ | N/mm$^2$ | 7.0 | 7.0 | 7.0 | 7.0 | 7.0 |
| | | Thickness $t_2$ | μm | 455 | 235 | 180 | 110 | 55 |
| | First resin layer | Young's modulus $E_1$ | N/mm$^2$ | 9.6 | 9.6 | 9.0 | 8.5 | 8.2 |
| | | Thickness $t_1$ | μm | 305 | 300 | 400 | 540 | 650 |
| | Second resin layer | Young's modulus $E_2$ | N/mm$^2$ | — | 7.0 | 7.0 | 7.0 | 7.0 |
| | | Thickness $t_2$ | μm | — | 225 | 180 | 110 | 55 |
| | Entire interlayer film | Colorant | % by mass | 0.038 | 0.038 | 0.038 | 0.037 | 0.037 |
| | $E_1/E_2$ | | | 1.37 | 1.37 | 1.29 | 1.21 | 1.17 |
| | $t_1/t_2$ | | | 0.67 | 1.28 | 2.22 | 4.91 | 11.82 |
| Evaluation | Average of visible light transmittance Tv (%) | | | 1.52 | 1.49 | 1.60 | 2.26 | 2.44 |
| | CV value of visible light transmittance (%) | | | 25.8 | 24.6 | 24.4 | 31.2 | 38.5 |

TABLE 2

| | | | | Example 4 | Example 5 | Example 6 | Example 7 | Example 8 |
|---|---|---|---|---|---|---|---|---|
| Resin composition | First resin layer | Resin | Kind | PVB | PVB | PVB | PVB | PVB |
| | | | Parts by mass | 100 | 100 | 100 | 100 | 100 |
| | | Plasticizer | Kind | 3GO | 3GO | 3GO | 3GO | 3GO |
| | | | Parts by mass | 40 | 40 | 41 | 42 | 40 |
| | | Colorant | Kind | Carbon black | Carbon black | Carbon black | Carbon black | Carbon black |
| | | | % by mass | 0.171 | 0.183 | 0.176 | 0.289 | 0.123 |
| | Second resin layer | Resin | Kind | PVB | PVB | PVB | PVB | PVB |
| | | | Parts by mass | 100 | 100 | 100 | 100 | 100 |
| | | Plasticizer | Kind | 3GO | 3GO | 3GO | 3GO | 3GO |
| | | | Parts by mass | 40 | 40 | 39 | 38 | 40 |
| Interlayer film for laminated glass | Second resin layer | Young's modulus $E_2$ | N/mm$^2$ | 7.0 | 7.0 | 8.1 | 9.3 | 7.0 |
| | | Thickness $t_2$ | μm | 170 | 170 | 170 | 320 | 270 |
| | First resin layer | Young's modulus $E_1$ | N/mm$^2$ | 11.0 | 11.2 | 10.1 | 12.0 | 9.8 |
| | | Thickness $t_1$ | μm | 170 | 150 | 170 | 100 | 210 |
| | Second resin layer | Young's modulus $E_2$ | N/mm$^2$ | 7 | 7.0 | 8.1 | 9.3 | 7.0 |
| | | Thickness $t_2$ | μm | 160 | 180 | 160 | 340 | 280 |
| | Entire interlayer film | Colorant | % by mass | 0.058 | 0.055 | 0.060 | 0.038 | 0.034 |
| | $E_1/E_2$ | | | 1.57 | 1.60 | 1.25 | 1.29 | 1.40 |
| | $t_1/t_2$ | | | 1.06 | 0.83 | 1.06 | 0.29 | 0.75 |
| Evaluation | Average of visible light transmittance Tv (%) | | | 1.93 | 3.96 | 2.06 | 1.52 | 4.80 |
| | CV value of visible light transmittance (%) | | | 20.5 | 10.0 | 19.3 | 23.7 | 8.2 |

| | | | | Comparative Example 3 | Comparative Example 4 | Comparative Example 5 | Comparative Example 6 |
|---|---|---|---|---|---|---|---|
| Resin composition | First resin layer | Resin | Kind | PVB | PVB | PVB | PVB |
| | | | Parts by mass | 100 | 100 | 100 | 100 |
| | | Plasticizer | Kind | 3GO | 3GO | 3GO | 3GO |
| | | | Parts by mass | 41 | 40 | 41 | 39 |
| | | Colorant | Kind | Carbon black | Carbon black | Carbon black | carbon black |
| | | | % by mass | 0.121 | 0.097 | 0.096 | 0.053 |
| | Second resin layer | Resin | Kind | PVB | PVB | PVB | PVB |
| | | | Parts by mass | 100 | 100 | 100 | 100 |
| | | Plasticizer | Kind | 3GO | 3GO | 3GO | 3GO |
| | | | Parts by mass | 39 | 40 | 40 | 41 |

TABLE 2-continued

| | | | | | | | |
|---|---|---|---|---|---|---|---|
| Interlayer film for laminated glass | Second resin layer | Young's modulus $E_2$ | N/mm² | 8.1 | 7.0 | 7.0 | 6.1 |
| | | Thickness $t_2$ | μm | 130 | 98 | 235 | 110 |
| | First resin layer | Young's modulus $E_1$ | N/mm² | 8.9 | 9.2 | 8.3 | 9.3 |
| | | Thickness $t_1$ | μm | 240 | 300 | 300 | 540 |
| | Second resin layer | Young's modulus $E_2$ | N/mm² | 8.1 | 7.0 | 7.0 | 6.1 |
| | | Thickness $t_2$ | μm | 130 | 102 | 225 | 110 |
| | Entire interlayer film | Colorant | % by mass | 0.058 | 0.058 | 0.038 | 0.038 |
| | $E_1/E_2$ | | | 1.09 | 1.32 | 1.18 | 1.52 |
| | $t_1/t_2$ | | | 1.85 | 2.94 | 1.00 | 4.91 |
| Evaluation | Average of visible light transmittance Tv (%) | | | 1.95 | 2.02 | 1.58 | 1.62 |
| | CV value of visible light transmittance (%) | | | 30.2 | 36.3 | 27.9 | 29.8 |

INDUSTRIAL APPLICABILITY

The present invention can provide an interlayer film for a colored laminated glass which exhibits, when incorporated in a laminated glass together with two clear glass plates in conformity with JIS R3202 (1996), a visible light transmittance Tv of 5% or lower, small variation in visible light transmittance from portion to portion and an excellent appearance, and a colored laminated glass produced using the interlayer film for a colored laminated glass.

The invention claimed is:

1. An interlayer film for a colored laminated glass, the interlayer film having recesses on at least one surface thereof and exhibiting visible light transmittance Tv of 5% or lower when incorporated in a laminated glass together with two clear glass plates in conformity with JIS R3202 (1996),
    the interlayer film for a colored laminated glass comprising a laminate of at least two layers including a first resin layer containing a thermoplastic resin and a colorant and a second resin layer containing a thermoplastic resin and no colorant,
    wherein a tensile elastic modulus $E_1$ of the first resin layer and a tensile elastic modulus $E_2$ of the second resin layer have a ratio $E_1/E_2$ of 1.25 or more, the thickness $t_1$ of the first resin layer and the thickness $t_2$ of the second resin layer have a ratio $t_1/t_2$ of 2.0 or less, and a CV value of visible light transmittance (%) obtained by a following equation is 23.7% or less:
    CV value=standard deviation/average of visible light transmittance×100.

2. The interlayer film for a colored laminated glass according to claim 1, comprising a laminate of at least three layers including a first resin layer interposed between two second resin layers.

3. A colored laminated glass comprising:
    a pair of glass plates; and
    the interlayer film for a colored laminated glass according to claim 1 interposed between the pair of glass plates.

4. A colored laminated glass comprising:
    a pair of glass plates; and
    the interlayer film for a colored laminated glass according to claim 2 interposed between the pair of glass plates.

* * * * *